(No Model.)
H. M. ROBINSON.
SYSTEM AND APPARATUS FOR HEATING WATER BY WASTE SOURCES OF HEAT.
No. 578,467. Patented Mar. 9, 1897.
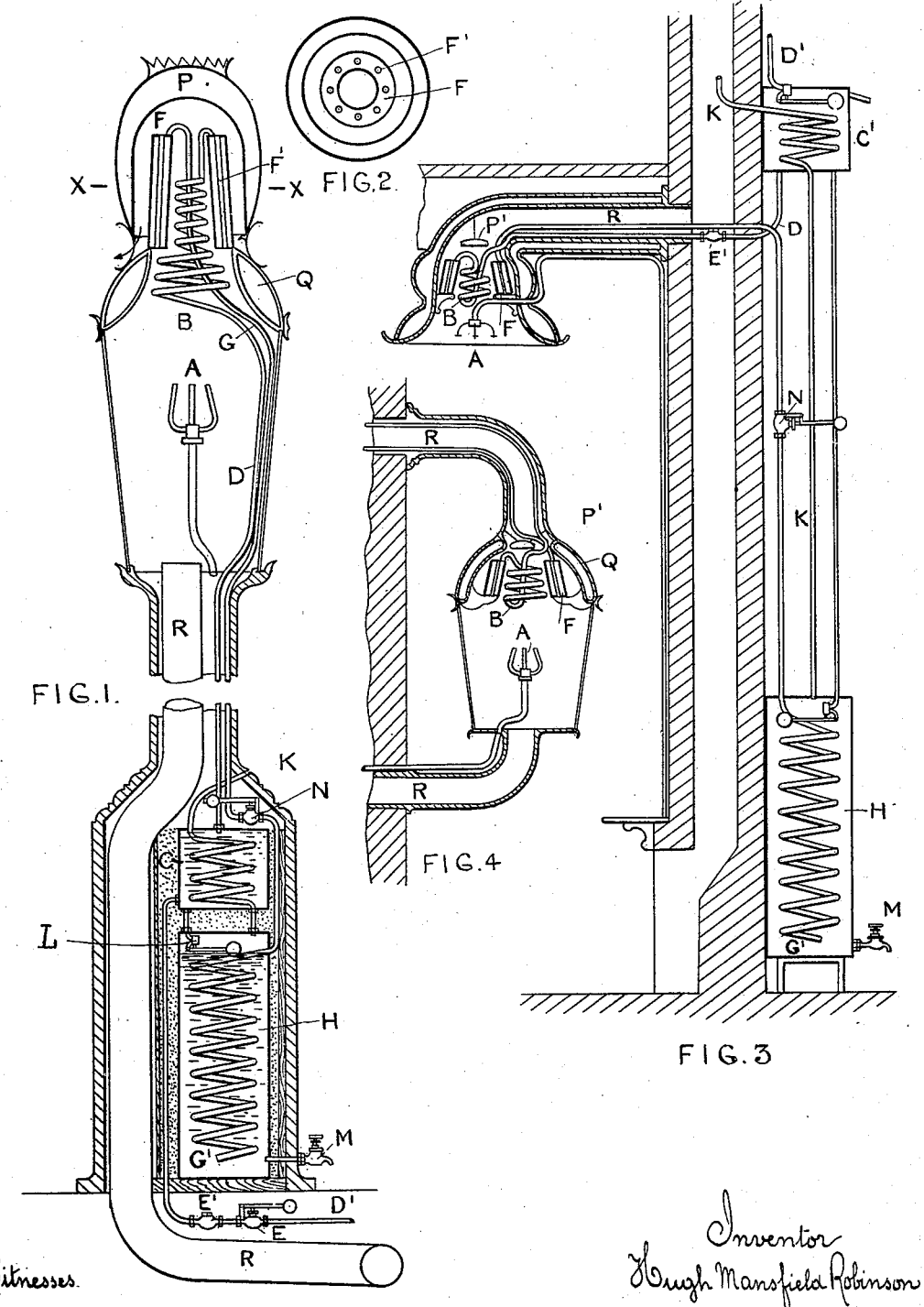

UNITED STATES PATENT OFFICE.

HUGH MANSFIELD ROBINSON, OF LONDON, ENGLAND.

SYSTEM AND APPARATUS FOR HEATING WATER BY WASTE SOURCES OF HEAT.

SPECIFICATION forming part of Letters Patent No. 578,467, dated March 9, 1897.

Application filed April 7, 1896. Serial No. 586,558. (No model.)

*To all whom it may concern:*

Be it known that I, HUGH MANSFIELD ROBINSON, residing at London, England, have invented an Improved System and Apparatus Used Therein for Heating Water by Waste Sources of Heat, of which the following is a specification.

This invention relates to the utilization of hitherto wasted sources of heat from flames used for illumination or ventilating purposes; and it consists of a system and apparatus used therein whereby the calorific properties of such flames hitherto wasted may be utilized for the production of hot or boiling water without interference in any way with their other functions of illumination or ventilation, or of both combined.

The essence of this system is the arrangement of a vaporizing-coil and superheating-chamber supplied with water above the flames or burner, so that other functions of the flame, such as illumination or the induction of a ventilating-draft, are not impaired or interfered with, the steam produced in such evaporating-coil and superheater being forced under pressure by the vaporizing-coil to a cistern containing water, situated any distance apart from or below the said flame, as, for instance, in the base of the standard or erection carrying the illuminating-flame or at any convenient distance from it in an adjoining building or room, and the water contained in such cistern is thereby heated or boiled and may be withdrawn for various useful purposes.

Where this system and apparatus is applied to a lamp or flame in a public place, I may arrange any well-known coin-freed mechanism in connection with the draw-off cock in such a manner that a predetermined quantity of hot or boiling water can be obtained in exchange for a coin of given value.

It is obvious my improved system may be applied to many varied forms of illuminating and ventilating gas or oil lamps; but by way of example—

Figure 1 is a sectional elevation of my system of apparatus as applied to a street-lamp or standard with a sewer-ventilating shaft therein, and Fig. 2 is a transverse section through the superheating-chamber on $x\ x$. Fig. 3 is a sectional elevation of my system of apparatus as applied to a chamber ventilating and illuminating overhead lamp or gaselier. Fig. 4 is a sectional elevation of my system of apparatus as applied to an external hanging lamp and ventilator.

Like parts are marked with similar letters in the various figures.

A is a gas or oil flame as used in the usual manner for illumination or for causing an induced ventilation-current, or for both purposes combined. In order to utilize the calorific value of such flame, otherwise partly or entirely wasted, and without interference with its illuminating or ventilating utility, I apply a vaporizing-coil B of metal tubing at some little distance above such flame and in the exit-passage of the hot gases of combustion, but so as not to interfere with its lighting or other effect. This vaporizing-coil B is supplied with water by the pipe D, either by the water-pressure from a closed tank C, connected direct to the water-main by a pipe D', as in Fig. 1, or by gravitation from an open supply-tank C', where the latter may be conveniently fixed above the flame, as in Fig. 3, the said supply-tank C' being fed from the main D' by the usual ball-tap.

The supply-pipe D' from the water-main to the coil B in Fig. 1 is provided with a reducing-valve E to maintain a constant pressure of water to the coil B, and with a check-valve E', common to all devices, so that the desired pressure arising from the generation of steam in the vaporizing-coil B cannot force back the water into the supply tank or main, but must descend into the hot-water tank, wherever the latter may be placed. The other end of the coil B is connected to a superheating annular chamber F, forming the wall of the exit-passage of the hot gases, and provided with small hot-gas tubes F' therethrough. The steam generated in the vaporizing-coil B is here superheated and its temperature and pressure raised, and thus forces its way by the pipe G to a coil G' in a tank H at any convenient distance from or below the flame; that is, either in the base of the standard, as in Fig. 1, or in an adjoining apartment, as in Fig. 3, or elsewhere.

The lower end of the heating-coil G' is open, and any surplus steam collecting in the tank H is carried off by an open vent-pipe K, such vent-pipe passing through the cold-water-supply tank C to partially heat the supply-water before going to the vaporizing-coil B.

The tank H is fed with water by a ball-tap L from the supply-tank C or C', filled from the main or other source of supply. An exit-cock M is provided for the withdrawal of hot water from the tank H.

In order to prevent the cold-water supply from continuously running to waste through the system of piping, the hot-water tank, and the open vent, I apply a weighted valve N in the exit-pipe from the superheater, which valve is so weighted that it will resist the pressure of the water, either from the supply tank or main, but will lift and allow the steam to force its way from the superheater to the hot-water tank when the pressure therein has risen above the water-pressure.

Where the exit for the hot gases of combustion is to the open air, as in Fig. 1, I apply a jacketed hood P over the top of the uptake of the hot gases, so as to divert them downward about the outside of the superheater F, and where the return-hood cannot be conveniently employed I use a hollow baffle-plate P' to retain the heat. When the light is inclosed in a lantern, I make such portion of the lantern as is not required to be transparent or open in a hollow form Q, as an air-jacket, or I clothe or line it with material non-conducting to heat, so as to retain the largest possible amount of heat within the exit-passage, in which are situated the vaporizing-coil and superheater.

In Figs. 1, 3, and 4 a ventilating-shaft R from a sewer, apartment, or other place which it is desired to ventilate is shown in combination with my system of apparatus as above described, the noxious gases passing through the flames, and in Fig. 1 allowed to issue into the open air.

In Figs. 3 and 4 the exit ventilating-shaft R from a ceiling or external lamp for ventilation is carried conveniently into an adjoining chimney, my system of apparatus being shown in combination therewith.

It is important to this system for the transmission to a distance of the heating effect of a gas or other flame, which itself may be utilized for lighting or other purposes, that steam shall actually be generated in the vaporizing-coil B at considerable pressure, and that the transmission of heat for the boiling or heating of water shall be effected by the transmission of such superheated steam rather than by attempting to heat the water in quantity in a heating-coil surrounding the light or flame, which would be impracticable as applied to flames utilized for illumination. The arrangement of check-valve E' in the water-supply from a main or other gravitation supply on the feed-pipe to the vaporizing-coil B and of the check pressure-valve N in the exit-pipe from the said coil B and superheater F is essential for this purpose, the check pressure-valve N being so weighted as to close against a pressure considerably in excess of the maximum water-supply pressure, thus causing a generation of high-pressure superheated steam in the vaporizer B and superheater F before there is any delivery through the exit-pipe G. The pressure of water-supply from any main is usually constant and a known force in any specific position, and the check pressure-valve N may be weighted accordingly to considerably overbalance any such known water-pressure; but should the water-pressure of supply be liable under any circumstances to vary at any specific apparatus the reducing-valve E in the supply water-main will serve as a means for maintaining the water-supply at a required maximum amount under that of the pressure to which the check pressure-valve N is loaded, which is conveniently at twenty to thirty pounds or more above that of ordinary water-supply pressure.

Having now described my invention, what I claim, and desire to secure by Letters Patent, is—

1. In combination, with a lamp and its burner, the inclosing shell or casing for said burner, the steam-generating coil above the burner and within the chamber, the superheating-chamber F also in said chamber above the burner forming the walls of the passage through which the heat and products of combustion escape, said coil being connected with the superheater, a water-heating tank and the pipe leading from said superheater to the said tank, substantially as described.

2. In combination, the burner, the shell or casing inclosing the said burner, the steam-generating coil above the burner, the superheater also above the burner forming the walls of the passage for the escaping products and connected with the heating-coil, the water-heating tank, the pipe connection between the same and the superheater, the supply-tank above the water-heating chamber, the pipe between the same and the steam-coil above the burner, and the pipe extending from the top of the water-heating tank through the supply-tank and coiled therein, whereby the said supply-tank feeds the steam-generating coil and is in turn heated by the steam supplied by said coil to the water-heating tank, substantially as described.

3. In combination, the burner, the shell or casing inclosing the same, the coil above the burner, and the superheating-chamber also above the burner and surrounding the heating-coil, said superheating-chamber forming the walls of the escape-passage for the products of combustion of the burner, and connected to the steam-generating coil, substantially as described.

4. In combination, the burner, a vaporizer acted upon thereby, a superheater connected to the vaporizer, a supply-pipe for feeding water under pressure to the vaporizer, a non-return check-valve on the water-pipe to prevent the pressure in the vaporizer and superheater from forcing back the water and for feeding the water to the vaporizer in limited quantities, a discharge-pipe for the steam from the superheater and a pressure-valve in said pipe for holding the pressure in the superheater until a predetermined degree has been reached.

5. In combination, the burner, the vaporizer, the superheater connected with the vaporizer, the water-supply pipe leading to the vaporizer, a check-valve and a reducing-valve therein controlling the supply-pressure to the vaporizer and preventing the return of the water, the discharge-pipe for the steam from the superheater, and a controlling weighted valve in said pipe adapted to resist water-supply pressure but to open when the steam-pressure in the vaporizer reaches a certain point.

6. In combination, a vaporizer, a burner, a superheating-chamber, a water-supply pipe to the vaporizer, means therein for controlling the supply of pressure-water to the vaporizer, a steam-pipe leading from the superheater, means for controlling the discharge of steam therethrough when a predetermined pressure has been reached, a hot-water tank, the said steam-pipe opening therein from the superheater, an auxiliary water-supply tank in the water-pipe, a ball-tap for controlling the supply of water to the hot-water tank from the supply-tank and an open exit-pipe for the surplus steam, said pipe passing through the water-supply tank, substantially as described.

In testimony whereof I have signed my name to this specification in the presence of two subscribing witnesses.

HUGH MANSFIELD ROBINSON.

Witnesses:
JOHN C. FELL,
CHARLES H. CARTER.